Nov. 10, 1959  J. STOIBER  2,911,895
DOUBLE EXPOSURE PREVENTION DEVICE
Filed Dec. 12, 1955  2 Sheets-Sheet 1

JOSEPH STOIBER
INVENTOR.

BY
ATTORNEYS

Nov. 10, 1959 J. STOIBER 2,911,895
DOUBLE EXPOSURE PREVENTION DEVICE
Filed Dec. 12, 1955 2 Sheets-Sheet 2

JOSEPH STOIBER
INVENTOR.

BY

ATTORNEYS

United States Patent Office 2,911,895
Patented Nov. 10, 1959

2,911,895
DOUBLE EXPOSURE PREVENTION DEVICE

Joseph Stoiber, Rochester, N.Y., assignor to Eastman Kodak Company, Rochester, N.Y., a corporation of New Jersey Application December 12, 1955, Serial No. 552,577

6 Claims. (Cl. 95—31)

The present invention relates to a roll-film camera and more particularly to a film-advance mechanism which is connected to a shutter-setting mechanism coupled with a double exposure prevention mechanism.

As is well known, in cameras of this type, it is desirable to provide a mechanism for setting or tensioning the shutter during the winding of the exposed film area. It is also desirable to actuate the setting of the shutter from the film-winding knob so that the latter is utilized both to wind up the exposed film area and to set the shutter. Furthermore, it is desirable to utilize the initial rotation only of the winding knob to set the shutter so that the setting of the shutter is completed before the winding operation is terminated. After the shutter is set, the setting mechanism is locked in set relation, and the winding knob is disconnected completely and automatically from the shutter so that the knob will be free to be rotated to complete the winding operation. It is also advantageous to lock the shutter-tripping mechanism after an exposure has been made to prevent the inadvertent making of a double exposure.

In order to secure these advantages, the present invention provides an operating member which is releasably connectable to the winding knob and is moved thereby into engagement with a shutter-setting mechanism to set the shutter. After the shutter has been set, the setting mechanism is locked in set position, and the operating member is disconnected both from the knob and the shutter-setting mechanism to free the knob for the additional film winding. When the member is thus disconnected, it is positively positioned so that it is accurately phased with the winding knob so that upon the subsequent rotation of the latter, the shutter is set during a definite arc of the initial rotation of the knob. Thus, the shutter is set and the setting mechanism locked during the initial movement only of the knob, and the latter is then freed, the advantage of which is deemed apparent to those in the art. After the shutter is set, it is tripped by means of a shutter trigger, and the return of the latter to its initial position locks the tripping mechanism to prevent a second actuation of the shutter and the making of an inadvertent double exposure.

The present invention has as its principal object the provision of a phasing mechanism which phases the shutter-setting mechanism so that the shutter will only be set during a definite portion of the initial rotation of the winding knob and in a specific relation thereto.

A further object of the invention is the provision of a mechanism for locking the shutter-setting mechanism in set relation.

A still further object of the invention is the provision of a phasing mechanism which is simple, rugged, inexpensive to manufacture, and highly effective in use.

Still another object of this invention is the provision of a mechanism by which the shutter is set automatically during the film winding operation.

Yet another object of the invention is the provision of a double exposure prevention device coupled with the shutter-setting mechanism so as to prevent effectively the setting of the shutter until the exposed image area has been wound.

To these and other ends, the invention resides in certain improvements and combinations of parts, all as will be hereinafter more fully described, the novel features being pointed out in the claims at the end of the specification.

Figure 1:
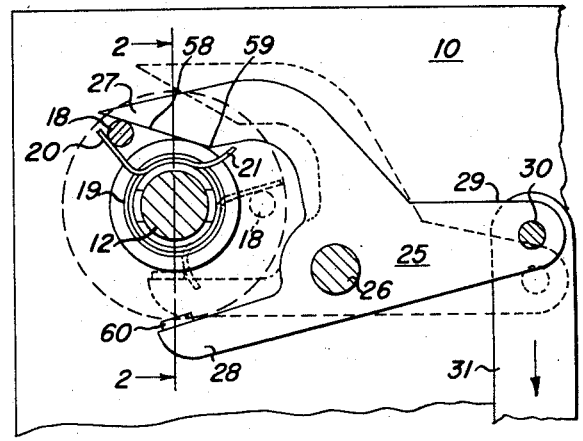
Fig. 1 is a side-elevation view of one wall of a camera with the winding-knob shaft in section, showing the relation of the winding-knob shaft to the upper portion of the shutter-setting mechanism, and the control thereof.
Figure 2:
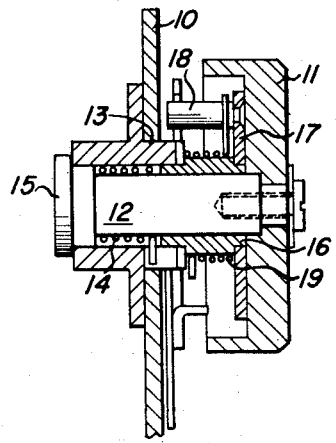
Fig. 2 is a vertical sectional view taken substantially on line 2—2 of Fig. 1, showing the relation of the operating parts associated with the winding knob.

Figs. 1 and 2 show a wall 10 of a camera on which is rotatably mounted a film-winding knob 11 having a shaft 12 which extends through an opening 13 in wall 10, as best shown in Fig. 2. The shaft 12 has mounted thereon a non-reversing coil-clutch spring 14 of standard design which will prevent reverse rotation of knob 11. The inner or left end 15 of shaft 12, as viewed in Fig. 2, is connectable to a film spool, not shown, in a well-known manner so that when the knob 11 is rotated the film spool also will be rotated to wind up the exposed film, as is well known.

A bushing 16 surrounds the shaft 12 and is connected or set into knob 11 so as to rotate therewith and with shaft 12. Thus, knob 11, shaft 12, and bushing 16 rotate as a unit, as is deemed apparent from an inspection of Fig. 2. A disc 17, provided with an axially extending pin 18, is positioned loosely on bushing 16 and within the knob 11, as shown in Fig. 2. A second coil-clutch spring 19 is loosely mounted on bushing 16 and has the opposite ends 20 and 21 thereof bent substantially radially, as best shown in Fig. 1 and for a purpose to be later described.

A lever 25 is pivotly or rockably mounted at 26 on the camera wall 10 adjacent knob 11, as best shown in Fig. 1. The left end of lever 25, as viewed in Fig. 1, is bifurcated to provide a pair of spaced arms 27 and 28 which extend over an overlie bushing 16 and spring 19, the purpose of which arrangement will be later described. The outer or right end 29 of lever 25, Fig. 1, has pivotly connected thereto at 30 a downwardly extending member or link 31, the lower end of which is connected at 33 to one arm 34 of a bell crank 35 rockably mounted at 36 on the shutter plate or wall 37. The other or vertical arm 38 of the bell crank 35 has pivotly connected thereto at 39 a second link 40, the other end of which is pivotly connected at 41 to a crank 42 rockable about a pivot 43.

It is thus deemed apparent that if the lever 25 is rocked clockwise about pivot 26, as viewed in Fig. 1, the lever will be moved from the solid-line position to the dotted-line position in Fig. 1. Such rocking of lever 25 will move link 31 downwardly to rock bell crank 35 clockwise, as viewed in Fig. 3, about pivot 36 to the position shown in Fig. 3. Such movement of the bell crank serves to tension or set the shutter, as will be later described.

The pivot 43 also has mounted thereon a bell crank 44 an arm of which is connected at 46 to a link 47, the other end of which is pivoted at 49 to an intermediate part of a shutter-tripping lever 50 pivoted at one end at 51 to the shutter plate 37. The other end of the lever 50 extends through a registering slot in wall 10 and terminates in a finger actuating portion 53, as clearly illustrated in Figs. 3 and 4. The other arm of the bell crank 44 terminates in a portion 55 which is adapted to engage a holding member of a shutter, to be later described, to free the shutter so that it may be tripped under the action of its tensioned spring.

Figure 3:
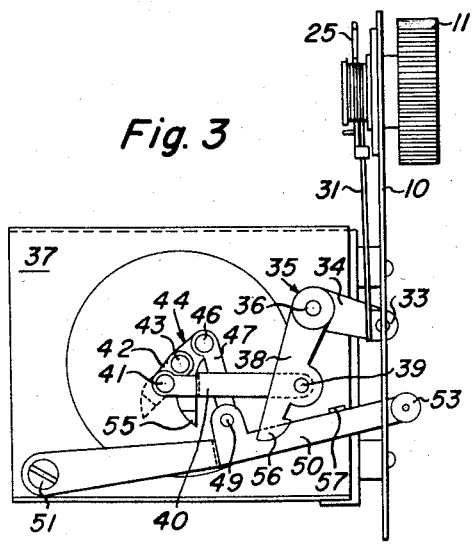
Fig. 3 is a rear view of the shutter plate showing the relation of the lower end of the setting mechanism to the shutter, the latter being in its set condition. For purposes of clarity, the shutter parts are omitted in this figure.

It will be deemed apparent from Fig. 3 that if the actuating portion 53 is moved downwardly the lever 50 will be rocked clockwise about its pivot 51. Such movement will pull downwardly on link 47 to rock the bell crank 44 clockwise about pivot 43 to move end 55 to the left, as shown in dotted lines in Fig. 3, to trip the shutter, in a manner to be later described. After the shutter has been tripped, the parts are moved to the position shown in Fig. 4, where a lug portion 56 on a vertical arm 38 of the bell crank 35 engages under an ear or lug 57 on the shutter-trip lever 50 to lock the shutter to prevent a second actuation thereof. Thus, when the shutter is once tripped to make an exposure it is automatically locked against a second actuation. However, the locking means is moved to an inoperative position to release the locking means when the exposed film is wound, as will be later described.

Referring now to Fig. 1, when the film is to be wound, the knob 11 and shaft 12 are rotated clockwise. Such rotation causes the coil-clutch spring 19 to grip bushing 16 so that the spring 19 will rotate as a unit with the shaft 12 and bushing 16. Such rotation of spring 19 will cause the projecting end 20 thereof to engage pin 18 to rotate disc 17 as a unit with the spring 19. As the disc 17 is rotated clockwise, Fig. 1, the pin will be moved into engagement with inclined or cam surface 58 formed on the under side of the upper bifurcation 27 of lever 25. Continued rotation of spring 19 and disc 17 will cause pin 18 to move along the cam surface 58 to rock lever 25 clockwise about pivot 26 from the solid-line position to the dotted-line position of Fig. 1. Such rocking of lever 25 serves to set the shutter as will be later more fully described. Such rotation of spring 19 and disc 17 is continued until the pin 18 finally moves off the end 59 of cam 58. The rotation is further continued until the end 20 of spring 19 and the pin 18 reach the position shown in dotted lines of Fig. 1. At that time, the end 21 of spring 19 reaches and engages a lug of ear 60 formed on the lower bifurcation 28 of lever 25. Such engagement serves to impart a slight unwinding action of spring 19 to disconnect the latter as well as a disc 17 with its pin 18 from the bushing 16 and hence from the winding knob 11. The latter is then free and may be rotated an additional amount to wind up the exposed image area completely.

Thus, during the initial rotation of the knob 11, and for a definite portion of such rotation, the spring 19 is connected to and rotated as a unit with the knob. The spring, in turn, picks up the disc 17 which also rotates as a unit with the knob and spring. This partial rotation of the disc 17 serves to bring the pin 18 into engagement with cam 58 to rock lever 25 to set the shutter. After such setting the spring 19 and disc 17 are completely and automatically disconnected from the knob and remain stationary in a position shown in Fig. 1 during the balance of the knob rotation. Thus, the setting mechanism is detachably connected to the wind-knob during the setting operation and is then disconnected therefrom.

It will be apparent that end 20 of spring 19 and pin 18 will always stop at the dotted-line position in Fig. 1 due to the engagement of the end 21 of the spring with the end 60. This engagement serves to phase the setting mechanism with the winding knob, as will be presently described. Now, when the shutter is tripped, the bell crank 35 rocks counterclockwise about its pivot 36 to the position shown in Fig. 4. Such rocking will move the horizontal arm 34 of bell crank 35 upwardly from the position shown in Fig. 3 to that shown in Fig. 4. Such upward movement of arm 34 will move link 31 upwardly to rock lever 25 counterclockwise about its pivot 26 from the dotted-line position to the solid-line position shown in Fig. 1. Such rocking of lever 25 serves to move the lug 60 out of holding relation with the end 21 of spring 19 to free the latter and disc 17 which, of course, remains stationary as knob 11 has completed the winding action and, hence, is also stationary.

Now when the knob 11 is again rotated to wind the film, the spring 19 is immediately and automatically clutched to bushing 16 to move as a unit with the knob 11. Also, as end 20 of spring 19 is in engagement with pin 18, the latter and hence disc 17 move as a unit with the winding knob. During the initial rotation of knob 11, the end 20 of spring 19 and the pin 17 move from the dotted-line position, Fig. 1, to the solid-line position where the pin first engages cam 58 and starts to rock lever 25 to set the shutter. Such rocking of lever 25 continues until the pin 18 finally drops off the end 59 of cam 58, at which time the lever has been rocked to the dotted-line position in Fig. 1 and the shutter has been set or tensioned. Thus, the setting of the shutter occurs in a little less than 360° rotation of pin 18 and hence knob 11. Also, this rotation is during the first part of the rotation of the knob. Therefore, the shutter is set during the initial portion of the rotation of the knob. Furthermore, as the end 20 and pin 18 are always stopped in the same location, dotted position in Fig. 1, the pin 18 and hence knob 11 will always be moved through exactly the same arc each time the shutter is set. Thus, the engagement of end 21 of spring 19 with lug 60 serves to phase the setting mechanism relative to the knob so the shutter will be always set in the same timed relation and same arc of rotation of the knob 11 and hence the winding of the film, the advantages of which are deemed apparent.

Figure 4:
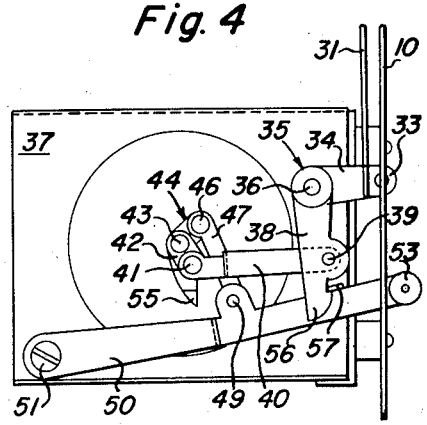
Fig. 4 is a view similar to Fig. 3 but showing the shutter-setting parts after the shutter has been tripped, and illustrating the mechanism for locking the shutter-setting mechanism to prevent the making of a double exposure. For purposes of clarity, the shutter parts are omitted in this figure.
Figure 5:
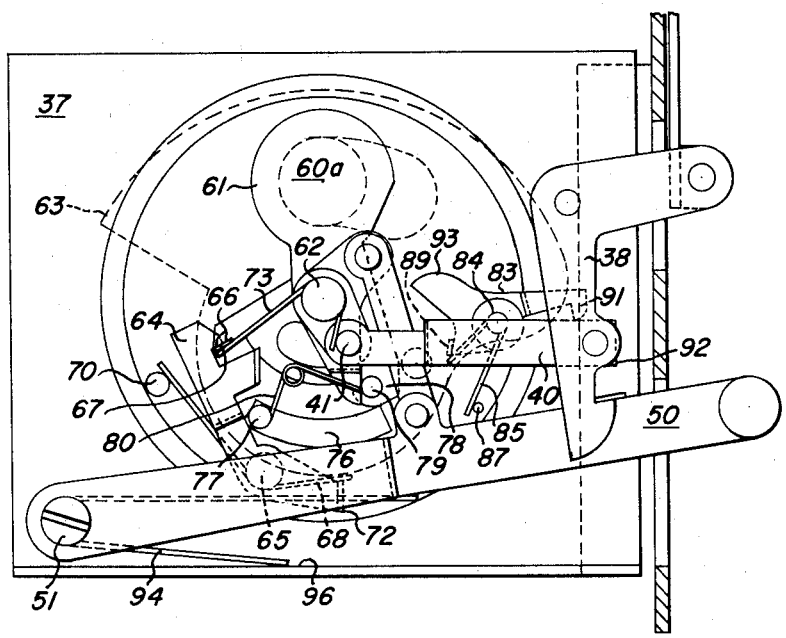
Fig. 5 is a rear elevation view of the shutter and its associated parts in released and locked portion to prevent a second actuation of the shutter trigger.
Figure 6:
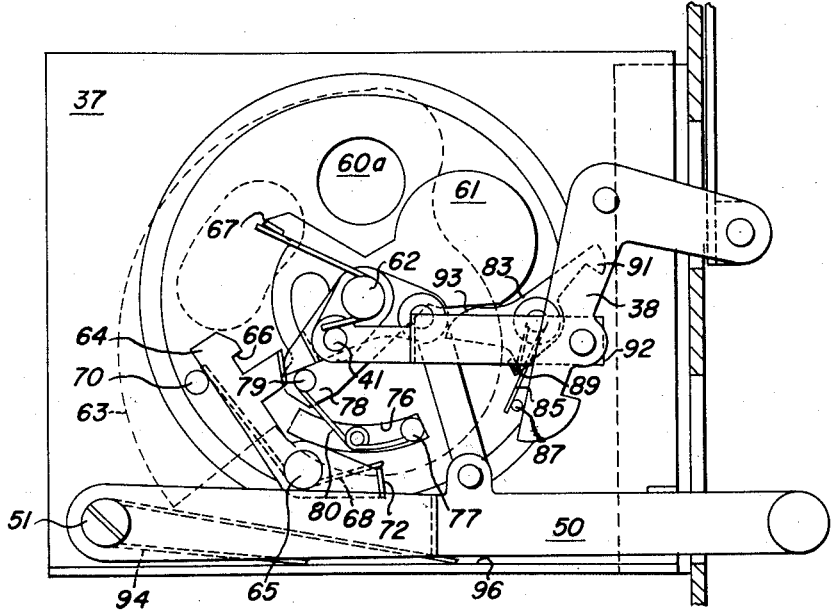
Fig. 6 is a view similar to Fig. 5 showing the relation of the parts after the actuation of the trigger and the unlocking of the shutter-setting mechanism.

Figs. 5 and 6, which are drawn to a larger scale than Figs. 3 and 4, show the shutter parts and the tensioning and tripping means therefor. The shutter plate 37 is provided with exposure aperture 60a. A shutter blind 61 is rockably mounted at 62 on one side of plate 37; and a shutter blade 63, of the shape shown in dotted lines, is rockably mounted on the one side of the plate 37 about a pivot, not shown, positioned slightly below pivot 62. The blind 61 and blade 63 cooperate with aperture 60a, in a manner to be presently described, to make an exposure. A shutter locking member 64 is rockably mounted, between its ends, at 65 on the same side of the plate 37 as blind 16. One end of member 64 is formed with a locking lug or shoulder 66 which is adapted to cooperate with an ear 67 on blind 61 to hold the parts during the tensioning or setting operation. A coil spring 68 is wrapped around pivot 65 and has one end engaging a stud 70 on plate 37 and the other end engaging an ear 72 on the end of member 64 and tending to rock the latter clockwise above pivot 65 to hold member 64 in holding relation with ear 67 of blind 61.

A coil spring 73 is wrapped around pivot 43 which is also pivot 62, and has the left end secured to ear 67 of blind 61 and the right end engaging pivot 41. The left end of spring 73 thus tends to rock blind 61 clockwise about its pivot 62, as is deemed apparent. The shutter plate 37 is provided with an arcuate slot 76 through which a pin 77, connected to shutter blade 63, extends. The blind 61 is provided with a portion 78 which extends below pivot 62, under portion 55 in Fig. 5, and is provided with an upstanding pin 79. A hairpin spring 80 has one end connected to pin 77 which, in turn, is connected to blade 63, and the other end connected to pin 79 which, in turn, is connected to plate 61. Thus, the spring 80 connects blind 61 to blade 63, the purpose of which construction will be presently described.

With the above shutter parts in mind, the operation of the shutter will now be described. It will be remembered that rotation of knob 11 will shift link 40 to the left from the position shown in Fig. 4 to the position shown in Fig. 3. This leftward movement of link 40 will also move pivot 41 and the right end of spring 73 to the left. However, as shoulder 66 of members 64 is in engagement with ear 67, the blind 61 and its ear 67, the blind 61 as well as associated or right end of spring 73 are held stationary. The result is that the leftward movement of the right end of spring 73 will move right end towards the left end to tension the spring 73, and hence the shutter parts. As the lever 50 is depressed, the bell crank 44 is rocked clockwise about its pivot 43 to move portion 55 to the left from the position shown in Fig. 4 to the position shown in Figs. 3 and 6 where portion 55 finally engages member 64 to rock the latter counterclockwise against the action of spring 68. Such rocking of member 64 serves to shift shoulder 66 out of holding relation with ear 67 to free blind 61 which now rocks clockwise about its pivot under the action of the tensioned spring 73. Such rocking of blind 61 clockwise serves to shift pin 79 to the left from the position shown in Fig. 5 to the position in Fig. 6 and serves to tension spring 80 so that when the pin 79 passes dead center, the tensioned spring 80 will quickly shift pin 77 to the right from the position shown in Fig. 5 to the position shown in Fig. 6 to rock blade 63 counterclockwise about its pivot. This combined movement of blind 61 and blade 63 serves first to uncover the aperture 60a to make an exposure and to then cover the aperture as is deemed apparent to those familiar with shutters of the plate and cover blind type.

As link 40 is moved to the left to tension the shutter, as above described, means must be provided to retain the link 41 in its leftward position to maintain the shutter in its tensioned or set relation. To this end, a double armed latch 83 is pivotally mounted at 84 on the shutter plate 37. A coil spring 85 is wrapped around pivot 84 and has one end thereof positioned against a pin 87 on plate 37. The other end of spring 85 engages an ear 89 on the latch 83 and tends to rock the latter clockwise about pivot 84, as is deemed apparent from an inspection of Figs. 5 and 6. One arm of latch 83 has formed on the free end thereof a hook 91 which is adapted to drop down behind the right end 92 of link 40 when the latter has reached its leftward position and has tensioned the shutter. The link 40 and its associated parts may, therefore, be considered a shutter tensioning means or member and the latch 83 may be considered as a member or means for retaining the shutter tension members in tensioned relation. The latch 83 is retained by spring 85 in its holding position until the shutter is tripped to make an exposure. At that time the blind 61 is rocked to the right or clockwise about its pivot 62, as above described. Near the end of its rocking movement the blind 61 finally engages an arm 93 of latch 83 and rocks the latter counterclockwise about its pivot 84 to move hook 91 out of holding relation with the end 92 of link 40 to release or free the shutter tensioned members as well as blind 61 and plate 63. Then, the parts are all returned to their initial position shown in Figs. 4 and 5 by means of a coil spring 94 which is wrapped around pivot 51 of the shutter tripping lever 50. To secure this result, one end of spring 94 rests against a shoulder or edge 96 of plate 37 or the other end is positioned under the lever 50 and tends to lock the latter counterclockwise about its pivot from the position shown in Fig. 6 to the position shown in Fig. 4. This return movement of lever 50 also moves link 40, bell crank 35 and the parts connected thereto to the position shown in Fig. 4 at which time lug 56 engages under ear 57 of lever 50 to hold the latter against a second actuation to thus prevent making of an accidental double exposure.

Thus, the present invention provides a novel means for phasing the shutter setting with the rotation of the winding knob and hence the winding of the film. Furthermore, the shutter is always set during exactly the same portion of the rotation of the winding knob and during the initial rotation thereof. After the shutter has been set, the shutter and its setting mechanism are completely and automatically disconnected from the winding knob, and are locked or held in set or tensioned relation. The knob may be rotated independently of the shutter and its tensioning mechanism to complete the winding of the film. After the shutter-tripping lever has been actuated to make an exposure, the shutter-setting means is locked and is subsequently released only during the initial rotation of the knob, as above described.

While only one embodiment of the invention has been described, it is to be understood that the inventive idea may be carried out a number of ways. Therefore, this application is not to be limited to the precise details described, but is intended to cover all variations and modifications thereof which fall within the scope of the appended claims.

I claim:

1. In a camera, the combination with a camera body, a shutter, a film winding knob rotatably mounted on said body for winding film, of setting means connected to said shutter, an actuating member loosely carried by said knob and engageable with said setting means to set said shutter, clutch means carried by said knob, means on said clutch for connecting said member to said knob for rotation therewith so as to set said shutter upon rotation of said knob, means to disconnect said member from said knob when said shutter is set, and means for phasing said member relative to said knob so that said shutter will be set in a definite timed relation to the rotation of the knob to wind the film.

2. In a camera, the combination with a camera body, a shutter, a film-winding knob rotatably mounted on said body, of shutter setting means connected to said shutter, a member loosely carried by said knob and movable into engagement with said setting means to actuate the latter to set the shutter, a coil-spring clutch carried by said knob, and connectable thereto for rotation therewith, means on said clutch for engaging and moving said member into engagement with said setting means to set the shutter, means to disconnect said clutch and member from said knob when said shutter is set, and means for phasing said member relative to said knob so that said shutter will be set in a definite timed relation to the rotation of the knob to wind the film.

3. In a camera, the combination with a camera body, a shutter, a film-winding knob rotatably mounted on said body, of shutter setting means connected to said shutter, a member loosely carried by said knob and movable into engagement with said setting means to actuate the latter to set the shutter, a coil-spring clutch carried by said knob, and connectable thereto for rotation therewith, means on said clutch for engaging and moving said member into engagement with said setting means to set the shutter, co-operating means on said clutch and said setting means to disconnect said clutch and member from said knob when the shutter is set, and means to phase said member relative to said knob so that said shutter is set in a definite timed relation to the rotation of said knob to wind the film.

4. In a camera, the combination with a camera body, a shutter, a film-winding knob rotatably mounted on said body, of shutter setting means connected to said shutter, and including a member pivoted on said body and having a bifurcation portion adjacent said knob, a plate loosely mounted on said knob, a pin carried by said plate and projecting axially therefrom, a coil-spring clutch carried by said knob and connectable thereto upon rotation of said knob for rotation therewith, means on said clutch engageable with said pin to move the latter into engagement with said portion to rock said member to set said shutter, and means on said portion cooperating with said clutch to disconnect the latter and said plate from said knob to permit the latter to be rotated independently to wind film, said last means serving to position said pin to phase said pin relative to said knob so that said shutter will be set in a definite timed relation to the rotation of said knob to wind the film.

5. In a camera, the combination with a camera body, a shutter, a film-winding knob rotatably mounted on said body, of shutter setting means connected to said shutter, and including a member pivoted on said body and having a bifurcation portion adjacent said knob, a plate loosely mounted on said knob, a pin carried by said plate and projecting axially therefrom, a coil-spring clutch carried by said knob and connectable thereto upon rotation of said knob for rotation therewith, means on said clutch engageable with said pin to move the latter into engagement with said portion to rock said member in one direction to set said shutter, stopping means on said portion co-operating with said clutch to arrest rotation of and to disconnect said plate and said clutch from said knob to phase said pin with said knob so that said shutter will be set in a definite timed relation to the initial rotation of said knob to wind film, and means associated with said shutter and operative upon the tripping thereof to rock said member in the opposite direction to shift said stopping means out of arresting relation with said plate and clutch so that said plate and clutch may be rotated with the knob on the next operation thereof.

6. In a camera, the combination with a camera body, a shutter, a shutter-actuating trigger, a rotatable film-winding knob carried by said body, a rockable lever pivoted on said body adjacent said knob, linkage means connecting said lever to said shutter so that rocking of said lever in one direction will set said shutter, a disc loosely mounted on said knob, a coil spring loosely mounted on said knob and connectable thereto and rotatable therewith when said knob is rotated to wind film, a pin on said disc, means on said spring movable into engagement with said pin to move the disc in one direction to move the pin into position to engage and rock said lever to set said shutter, means on said spring engaging said lever to disconnect said disc and said spring from said knob and to retain said pin in a definite position to phase said pin relative to said knob so that said shutter will be set in a definite timed relation to the rotation of said knob in winding the film, and means on said trigger movable into engagement with said linkage to lock the latter and said lever after the tripping of said trigger to prevent a second actuation of said shutter, the rotation of the knob to wind the film moving the pin into engagement with the lever to rock the latter in the other direction to release said lever from the locking means on said trigger.

References Cited in the file of this patent

UNITED STATES PATENTS

| 2,245,213 | Mihalyi | June 10, 1941 |
| 2,364,466 | Nagel | Dec. 5, 1944 |
| 2,742,835 | Owens | Apr. 24, 1956 |

FOREIGN PATENTS

| 642,319 | Great Britain | Aug. 30, 1950 |
| 1,083,950 | France | June 30, 1954 |